(12) United States Patent
Takei et al.

(10) Patent No.: US 7,996,970 B2
(45) Date of Patent: Aug. 16, 2011

(54) SEAT, METHOD OF MANUFACTURING THE SAME, AND METHOD OF TREATMENT FOR RECOVERY FROM PERMANENT SET IN FATIGUE OF THE SEAT

(75) Inventors: Yasuchika Takei, Shioya-gun (JP); Atsushi Suzuki, Osaka (JP)

(73) Assignees: TS Tech Co., Ltd., Asaka-shi (JP); Teijin Fibers Limited, Osaka (JP)

( * ) Notice: Subject to any disclaimer, the term of this patent is extended or adjusted under 35 U.S.C. 154(b) by 662 days.

(21) Appl. No.: 11/666,234

(22) PCT Filed: Oct. 25, 2005

(86) PCT No.: PCT/JP2005/019564
§ 371 (c)(1),
(2), (4) Date: Apr. 25, 2007

(87) PCT Pub. No.: WO2006/046541
PCT Pub. Date: May 4, 2006

(65) Prior Publication Data
US 2008/0284231 A1  Nov. 20, 2008

(30) Foreign Application Priority Data
Oct. 25, 2004 (JP) .................................. 2004-309472

(51) Int. Cl.
*B68G 7/00* (2006.01)
(52) U.S. Cl. ..................... 29/91.1; 29/419.1; 297/452.48
(58) Field of Classification Search ............. 297/452.48; 29/91.1, 419.1
See application file for complete search history.

(56) References Cited

U.S. PATENT DOCUMENTS

| | | | | |
|---|---|---|---|---|
| 5,082,720 A | * | 1/1992 | Hayes | 442/362 |
| 5,183,708 A | * | 2/1993 | Yoshida et al. | 428/373 |
| 5,593,525 A | | 1/1997 | Isoda et al. | |

FOREIGN PATENT DOCUMENTS

| | | |
|---|---|---|
| EP | 0894885 A2 | 2/1999 |
| JP | 5-156561 A | 6/1993 |
| JP | 5-321114 A | 12/1993 |
| JP | 8-318066 A | 12/1996 |
| JP | 9-176946 A | 7/1997 |
| JP | 1142147 A | 2/1999 |
| JP | 2003-33586 A | 2/2003 |
| JP | 2003-236965 A | 8/2003 |

* cited by examiner

*Primary Examiner* — Anthony D Barfield
(74) *Attorney, Agent, or Firm* — Sughrue Mion, PLLC

(57) ABSTRACT

To provide a seat having a three-dimensional complex undulated cushion body securing hardness in a stress direction and excelling in dispersibility of the stress and durability, and a method of manufacturing the same.

A seat 1 includes frames (15, 25), cushion bodies (11, 21) obtained by forming a plurality of sheet-like fibrous structures 4a to 4d integrally, and covers (13, 23), wherein a sheet-like fibrous structure 4 is formed by performing cotton blending of thermally adhesive composite short fibers to inelastic crimped short fibers and thermally adhering crossing points, and the sheet-like fibrous structure 4 satisfies a relationship of $A \geq 3B/2$ when the number of short fibers arranged along a thickness direction is represented as A and the number of short fibers arranged along a direction perpendicular to the thickness direction is represented as B, and the cushion bodies 11, 21 are obtained by disposing in a state in which the sheet-like fibrous structures 4a to 4d are stacked and compressed in a mold 40, and forming the sheet-like fibrous structures 4a to 4d integrally by performing high pressure steam molding, and provided on the frames 15, 25 such that a thickness direction extends along a direction in which a load is applied.

2 Claims, 7 Drawing Sheets

[FIG. 1]
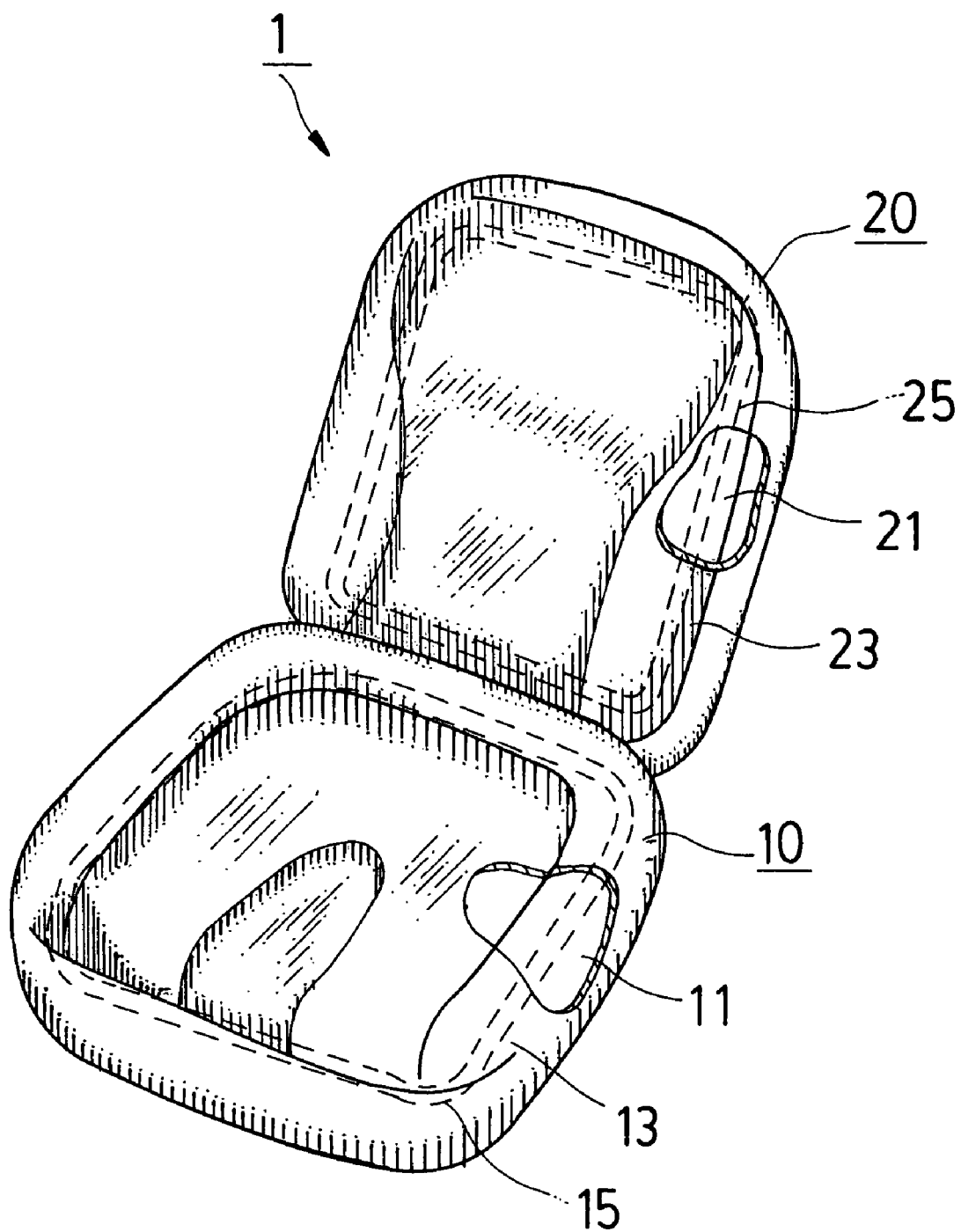

[FIG. 2]
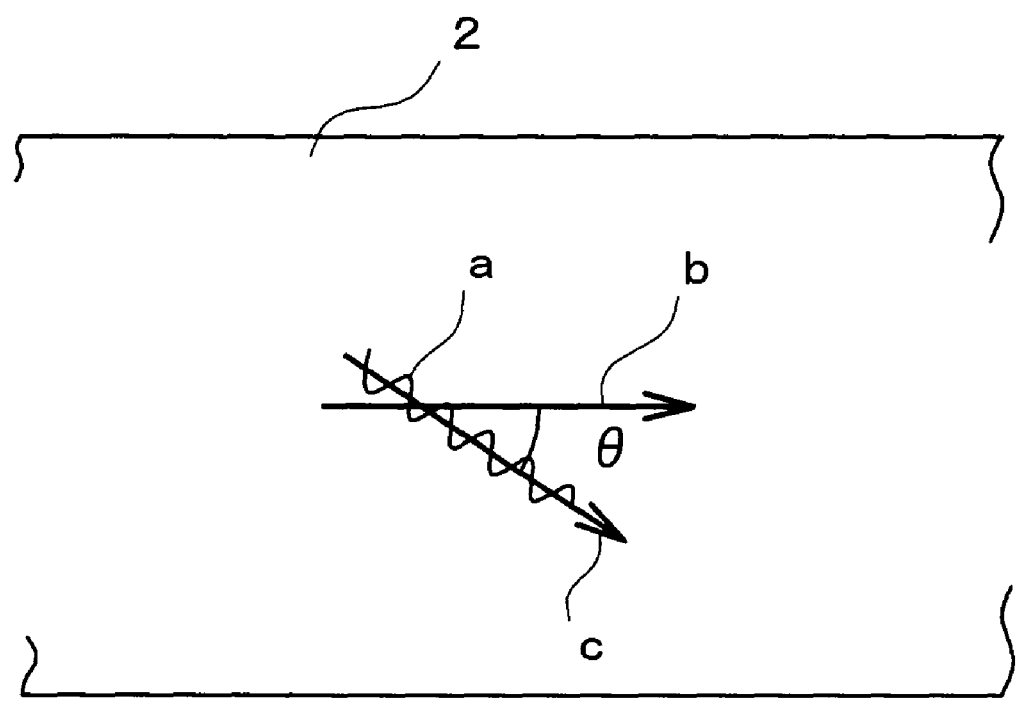

[FIG. 3]
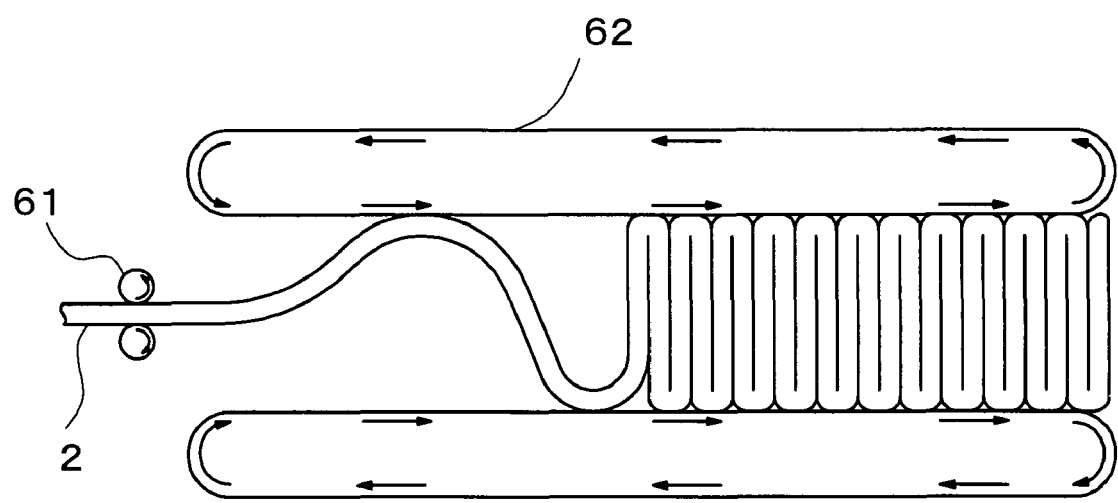

【FIG. 4】
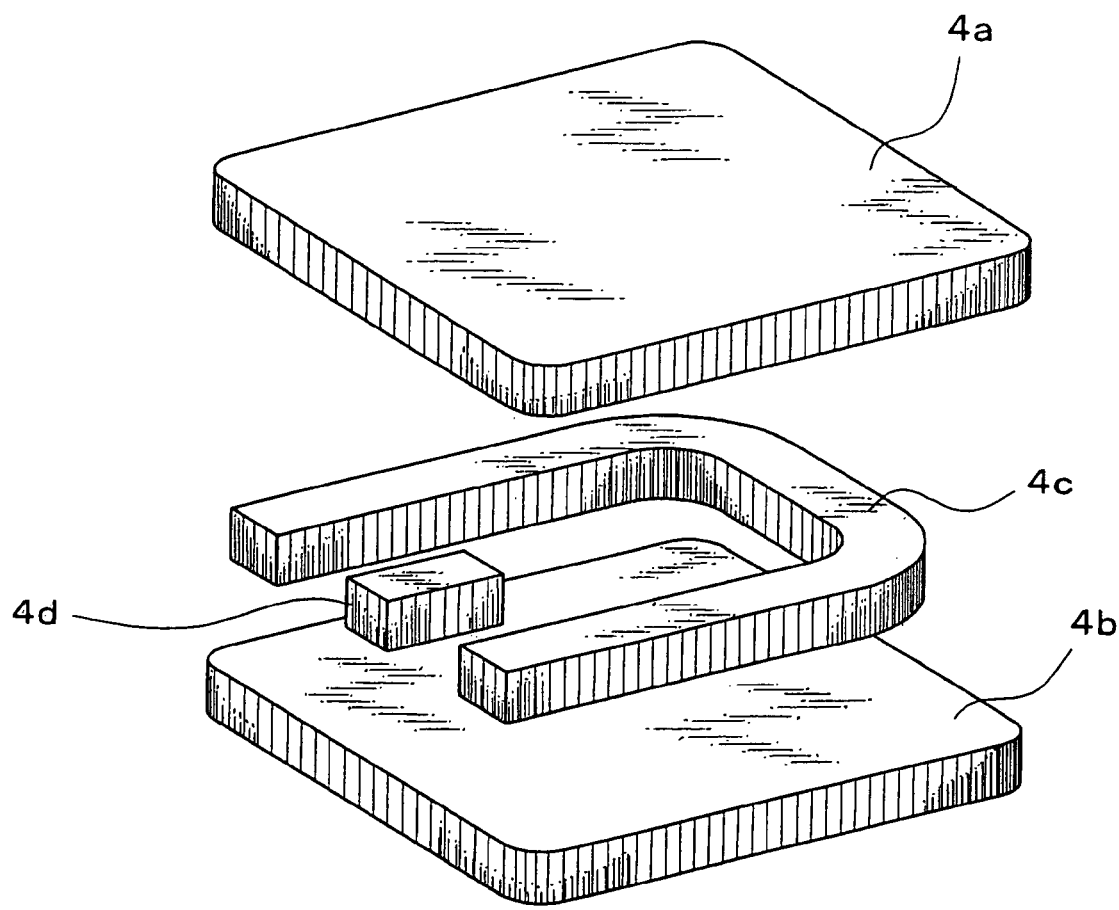

【FIG. 5】
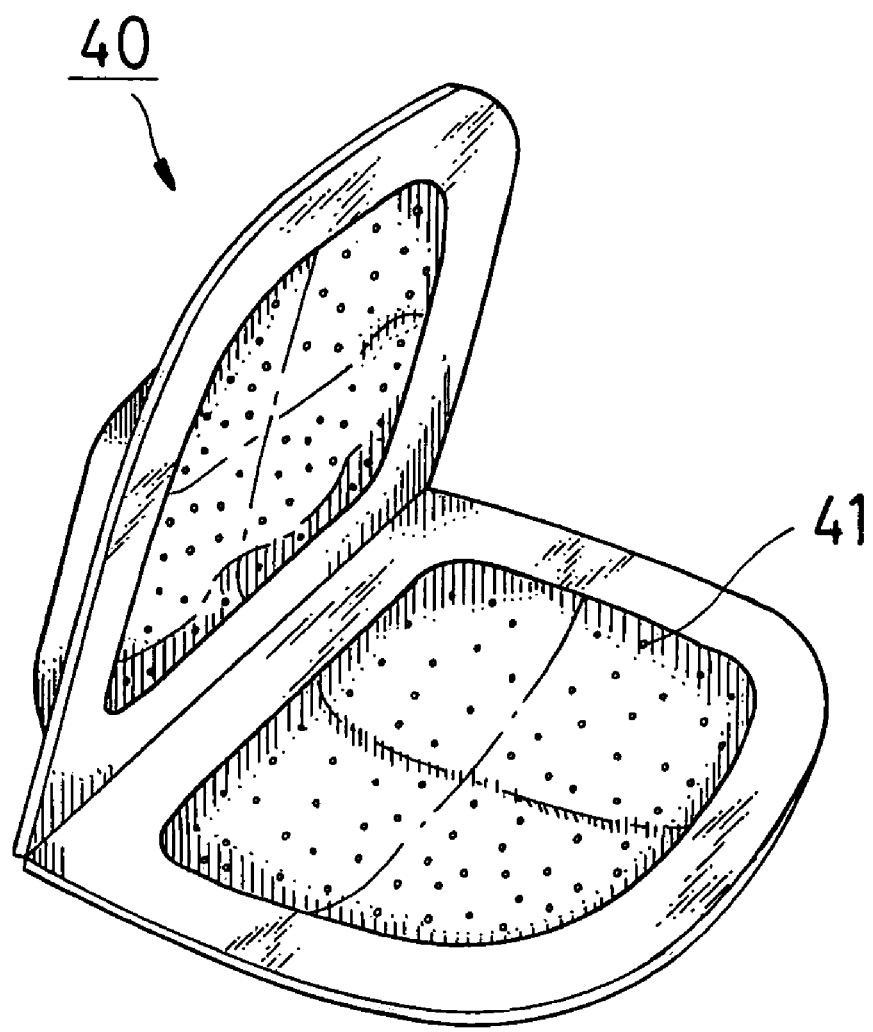

[FIG. 6]
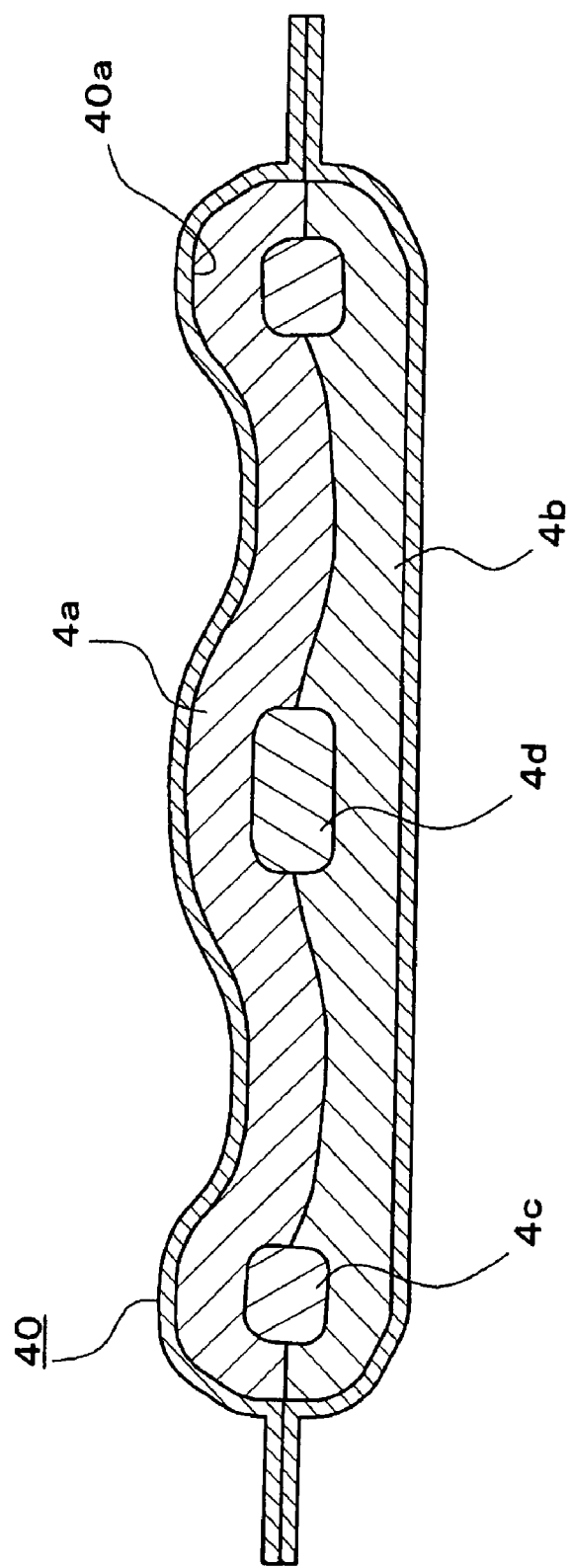

[FIG. 7]
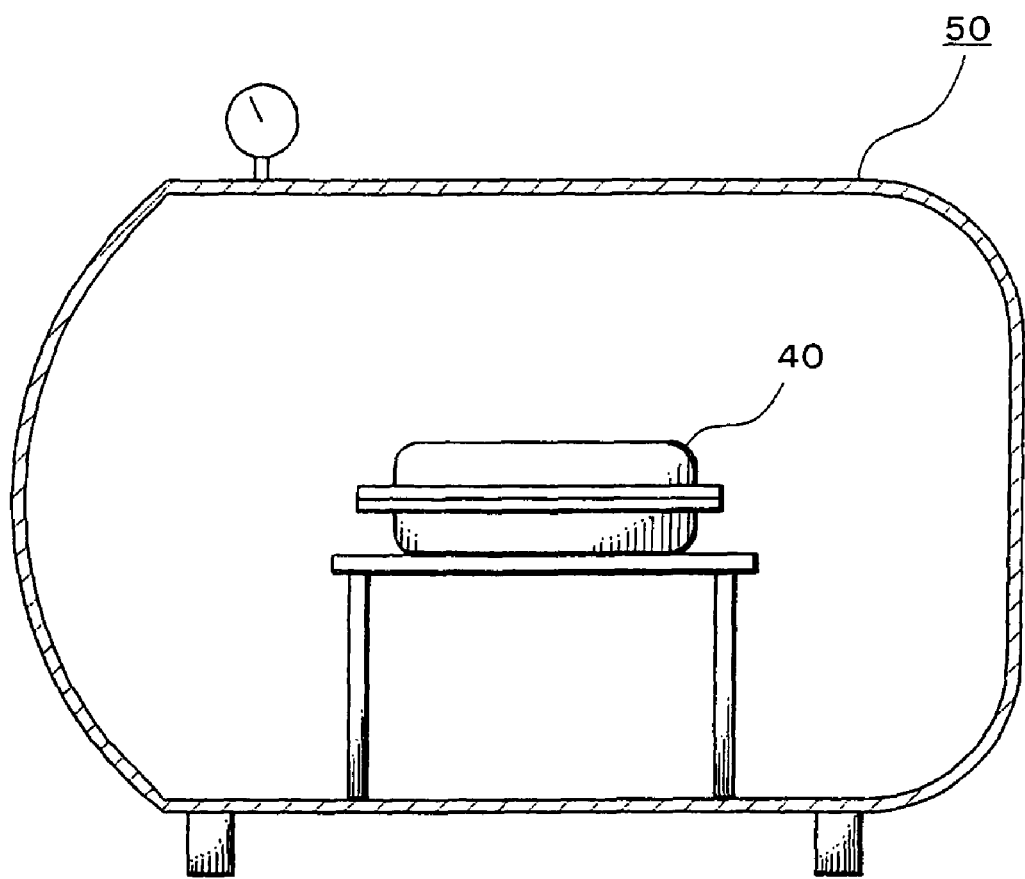

SEAT, METHOD OF MANUFACTURING THE SAME, AND METHOD OF TREATMENT FOR RECOVERY FROM PERMANENT SET IN FATIGUE OF THE SEAT

TECHNICAL FIELD

The present invention relates to a seat, a method of manufacturing the same, and a method of treatment for recovery from a permanent set in fatigue of the seat, and in particular to a seat using a fibrous cushion material, a method of manufacturing the same, and a method of treatment for recovery from a permanent set in fatigue of the seat.

BACKGROUND ART

Conventionally, a seat using polyester short fibers for a cushion material has been known (for example, see Patent Literature 1 and Patent Literature 2).

Patent Literature 1: Japanese Patent Laid Open No. 08-318066

Patent Literature 2: Japanese Patent Laid Open No. 05-321114

A cushion body used in a seat described in Japanese Patent Laid Open No. 08-318066 is a web obtained by dispersing and incorporating thermally adhesive composite short fibers as adhesive component into matrix fibers composed of an inelastic polyester crimped short fiber assembly, and the web satisfying a relationship of A>3B/2 when the total number of fibers directed in its lengthwise direction is represented as A and the number of fibers directed in its lateral direction is represented as B is in a state of being folded successively in a standing state along its lengthwise direction.

The thermally adhesive composite short fiber is composed of thermoplastic elastomer having a melting point lower than a melting point of polyester polymer constituting a short fiber by 40° C. or higher and inelastic polyester, where the former is at least exposed on a fiber surface.

The cushion body is constituted such that flexible heat-adhesion spots formed by thermally adhering the thermally adhesive composite short fibers in a state of crossing one another and flexible heat-adhesion spots formed by thermally adhering the thermally adhesive composite short fibers and the inelastic polyester short fibers in a state of crossing one another are dispersed in the web when the web is folded in a standing state.

Further, this cushion body is disposed in the seat such that a standing direction of cushioning filler is directed in a direction in which a load is applied.

Since this seat is constituted in such a state that a lengthwise direction of the fibers in the web extends along a load direction, excellent ventilation is, of course, secured, proper hardness to a stress direction is provided, and it becomes easy to disperse the stress.

A cushion body used in a seat described in Japanese Patent Laid Open No. 05-321114 is formed to have a mold face shape molded by disposing a fibrous body composed of a thermoplastic binder which is melted by steam heat and a fibrous group having moderate bulkiness mixed with fibers having a melting point higher than a melting point of this binder between a mold face of a lower mold and a mold face of an upper mold at least one of which has a lot of blowout holes for steam, clamping the both molds, and blowing steam from the blowout holes.

Since the fibrous body including the thermoplastic binder which is melted by the steam heat is disposed in a mold and subjected to steam molding in this manner, it becomes possible to obtain a cushion body having a desired shape.

The art of Patent Literature 1 is preferable to a seat having a two-dimensional structure, but it is insufficient for a seat having a three-dimensional structure. That is, in the art of Patent Literature 1, it is difficult to form a load abutting face into a complex undulation shape or to change cushioning feeling partially, so that a seat producing a good sitting feel has not been able to be obtained.

Further, in the art of Patent Literature 2, the cushion body can be formed into a three-dimensional undulation shape, but it is insufficient regarding hardness in a stress direction, dispersibility of the stress or durability.

There is a problem that a permanent set in fatigue may be generated in a fibrous cushion body due to reception of compression strain in the course of repetitive actual use.

In view of these circumstances, an object of the present invention is to provide a seat having a three-dimensional complex undulated cushion body securing hardness in a stress direction and excelling in dispersibility of the stress and durability and a method of manufacturing the same.

Further, another object of the present invention is to provide a method of treatment for a seat which can recover from a permanent set in fatigue even if the permanent set in fatigue is generated due to that a cushion body of the seat is applied with a load repeatedly.

DISCLOSURE OF THE INVENTION

The present invention is a seat provided with a seat frame, a cushion body obtained by forming a plurality of sheet-like fibrous structures integrally, and a cover covering the cushion body, wherein the sheet-like fibrous structure is formed such that adhesion spots where thermally adhesive composite short fibers are caused to thermally adhere to one another in a state in which the thermally adhesive composite short fibers have crossed one another and adhesion spots where inelastic crimped short fibers having a melting point higher than that of the thermally adhesive composite short fibers and the thermally adhesive composite short fibers are caused to thermally adhere to each other in a state in which inelastic crimped short fibers and the thermally adhesive composite short fibers have crossed each other are dispersed and distributed and the sheet-like fibrous structure satisfies a relationship of A≧3B/2 when the number of short fibers arranged along in a thickness direction is represented as A and the number of short fibers arranged along a direction perpendicular to the thickness direction is represented as B regarding unit volume; and the cushion body is formed integrally by disposing the plurality of sheet-like fibrous structures in a mold having a cavity with a predetermined shape and formed with steam holes in a state that the sheet-like fibrous structures are stacked and compressed in a thickness direction and by blowing steam to the mold at an air pressure higher than atmospheric pressure, and the cushion body is disposed on the seat frame such that a thickness direction extends along a direction in which a load is applied during sitting of a seat occupant.

As described above, in the present invention, the cushion body is formed by stacking, in a thickness direction, the sheet-like fibrous structures formed such that the number of fibers extending along the thickness direction is three-halves as large as or larger than that of fibers extending along a direction perpendicular to the thickness direction and performing high-pressure steam molding in the mold. The cushion body is disposed on the seat frame such that the thickness direction thereof extends along the direction in which a load is applied during sitting of a seat occupant.

Such a constitution allows the cushion body to be formed into a three-dimensional undulation shape in the seat according to the present invention. Further, since a lengthwise direction of fibers is directed in a load direction, the cushion body has proper hardness to a stress direction as well as excellent ventilation, and it is easy to disperse the stress. Further, the seat becomes excellent in durability. Therefore, comfortable feeling of sitting can be maintained for a long time when a seat occupant is sitting.

In addition, it is preferable that a density distribution of the sheet-like fibrous structure is in a range of 0.015 to 0.20 g/cm$^3$.

Further, it is good that a melting point of the thermally adhesive composite short fiber is at least 120° C. or more.

Specifically, the cushion body can be used in parts of at least a seat portion or a seatback portion.

Further, the present invention is a method of manufacturing a seat provided with a seat frame, a cushion body disposed on the seat frame, and a cover covering the cushion body, the method comprising:

a cushion body forming step of forming the cushion body; and an assembling step of attaching the cushion body and the cover on the seat frame, wherein in the cushion forming step, the cushion body is formed by forming a sheet-like fibrous structure such that adhesion spots where thermally adhesive composite short fibers are caused to thermally adhere to one another in a state in which the thermally adhesive composite short fibers have crossed one another and adhesion spots where inelastic crimped short fibers having a melting point higher than that of the thermally adhesive composite short fibers and the thermally adhesive composite short fibers are caused to thermally adhere to one another in a state in which the inelastic crimped short fibers and the thermally adhesive composite short fibers have crossed each other are dispersed and distributed and a relationship of $A \geqq 3B/2$ is satisfied when the number of short fibers arranged along in a thickness direction is represented as A and the number of short fibers arranged along a direction perpendicular to the thickness direction is represented as B regarding unit volume, and then cutting the sheet-like fibrous structure into plural pieces having predetermined shapes; disposing the plurality of sheet-like fibrous structures in a mold having a cavity with a predetermined shape and formed with steam holes in a state in which the plurality of sheet-like fibrous structures are stacked in a thickness direction and compressed; and blowing steam to the mold at an air pressure higher than atmospheric pressure.

A method of treatment for recovery from a permanent set in fatigue of a seat according to the present invention is characterized in that steam with a temperature higher than glass transition points of the thermally adhesive composite short fibers and the inelastic crimped short fibers and lower than a melting point of the thermally adhesive composite short fiber is blown to the cushion body.

BRIEF DESCRIPTION OF THE DRAWINGS

FIG. 1 is an explanatory diagram of a seat according to an embodiment of the present invention;

FIG. 2 is an explanatory diagram of a fiber direction in a web according to the embodiment of the present invention;

FIG. 3 is an explanatory diagram of a manufacturing step of a sheet-like fibrous structure according to the embodiment of the present invention;

FIG. 4 is an explanatory diagram of sheet-like fibrous structures bestandingacked according to the embodiment of the present invention;

FIG. 5 is an explanatory diagram of a mold according to the embodiment of the present invention;

FIG. 6 is an explanatory diagram of a manufacturing step of a cushion body according to the embodiment of the present invention; and FIG. 7 is an explanatory diagram of a manufacturing step of the cushion body according to the embodiment of the present invention.

BEST MODE FOR CARRYING OUT THE INVENTION

An embodiment of the present invention will be explained below with reference to the drawings. Incidentally, parts, arrangements or the like explained below do not limit the present invention, and the present invention can be modified variously within the scope and spirit of the present invention.

FIG. 1 to FIG. 7 show an embodiment of the present invention, FIG. 1 being an explanatory diagram of a seat, FIG. 2 being an explanatory diagram of a fiber direction in a web, FIG. 3 being an explanatory diagram of a manufacturing step of a sheet-like fibrous structure, FIG. 4 being an explanatory diagram of sheet-like fibrous structures before stacked, FIG. 5 being an explanatory diagram of a mold, and FIG. 6 and FIG. 7 being explanatory diagrams of a manufacturing step of a cushion body.

A seat 1 of this embodiment can be applied to a seat for a vehicle, a train, an airplane or the like, and it may be also applied to various chairs such as a business chair or a care chair. The seat 1 of the embodiment is provided with a seat portion 10 and a seatback portion 20, as shown in FIG. 1. The seat portion 10 and the seatback portion 20 are respectively constituted such that cushion bodies 11 and 21 are placed on seat frames 15 and 25 and the cushion bodies 11 and 21 are covered with covers 13 and 23.

The cushion body of the embodiment will be explained taking the cushion body 11 of the seat portion 10 as an example. The cushion body 21 is also formed according to a similar method as the above. The cushion body 11 of the embodiment is formed by forming a sheet-like fibrous structure 4 where a web 2 has been folded in a standing state as described below, disposing a plurality of the sheet-like fibrous structure 4 in a stacking manner in a mold 40 formed with countless numbers of steam holes on its mold face, and performing high pressure steam molding in a high pressure steam molding machine 50 in a state the mold 40 has been clamped.

First, the web 2 for forming the cushion body 11 of the embodiment will be explained. The web 2 is one obtained by dispersing and mixing, in matrix fibers composed of assemblies of inelastic crimped short fibers, thermally adhesive composite short fibers having a melting point lower than that of the inelastic crimped short fibers and having a melting point of at least 120° C. as adhesive component.

The web 2 of this embodiment is one obtained by performing cotton blending of inelastic polyester crimped short fibers as the inelastic crimped short fibers and the thermally adhesive composite short fibers composed of thermoplastic elastomer having a melting point lower than a melting point of polyester polymer constituting the inelastic polyester crimped short fibers by 40° C. or higher and inelastic polyester such that the fibers are mainly directed in a lengthwise direction of the web 2. The web 2 of the embodiment has a bulk property of at least 30 cm$^3$/g and it is formed with cubic fiber crossing points between the thermally adhesive composite short fibers and between the thermally adhesive composite short fibers and the inelastic polyester crimped short fibers.

In the embodiment, hollow polyethylene terephthalate fibers with a single yarn fineness of 12 deniers and a fiber length of 64 mm which have cubic crimp due to anisotropic cooling are used as the inelastic polyester crimped short fibers.

As the inelastic polyester crimped short fibers, short fibers made from ordinary polyethylene terephthalate, polytrimethylene terephthalate, polybutylene terephthalate, polyhexamethylene terephthalate, polytetramethylene terephthalate, poly-1,4-dimethylcyclohexane terephthalate, polypivalolactone, or copolymer ester thereof, cotton blended material of these fibers, composite fibers composed of two or more kinds of the above polymer components, or the like can be used. Short fibers of polyethylene terephthalate, polytrimethylene terephthalate, or polybutylene terephthalate of these short fibers are preferable. Further, potential crimped fibers composed of two kinds of polyethylene terephthalate and polytrimethylene terephthalate whose inherent viscosities are different from each other or a combination thereof, where crimps have micro-crimps due to heat treatment or the like can also be used.

Further, a sectional shape of the short fiber may be circular, oval, heterotypic, or hollow. A thickness of the short fiber is preferable in a range of 2 to 200 deniers, especially, preferably in a range of 6 to 100 deniers. Incidentally, when the thickness of this short fiber is thin, softness increases, but elasticity of the cushion body often lowers.

Further, when the thickness of the short fiber is excessively thick, handling easiness, especially, formability of the web 2 deteriorates. Furthermore, there is a possibility that the number of constituent fibers decreases excessively, the number of crossing points formed between the short fibers and the thermally adhesive composite short fibers also decreases so that elasticity of the cushion body is hard to develop and simultaneously durability lowers. Furthermore, texture becomes excessively rough and hard.

Further, in this embodiment, as the thermally adhesive composite short fibers, core/sheath type thermally melting composite fibers (a core/sheath ratio=60/40:weight ratio) with a single yarn fineness of 6 deniers and a fiber length of 51 mm which uses thermoplastic polyether ester elastomer with a melting point of 154° C. as sheath component and uses polybutylene terephthalate with a melting point of 230° C. as core component is used.

The thermally adhesive composite short fibers are composed of thermoplastic elastomer and inelastic polyester. Then, it is preferable that the former occupies at least ½ of a fiber surface. Regarding a weight ratio, it is appropriate that the former and the latter are in a range of 30/70 to 70/30 in a composite ratio. As an aspect of the thermally adhesive composite short fibers may be of a side by side type or of a sheath-core type, but the latter is preferable. In this sheath-core type, the inelastic polyester constitutes the core, but this core may be concentric or eccentric. Especially, the eccentric type is more preferable because coil-like elastic crimps are developed.

As the thermoplastic elastomer, polyurethane elastomer or polyester elastomer is preferable. Especially, the latter is appropriate. As the polyurethane elastomer, polyol with a low melting point having a molar weight of about 500 to 6000, for example, dihydroxy polyether, dihydroxy polyester, dihydroxy polycarbonate, dihydroxy polyester amide, or the like, organic diisocyanate with a molar weight of 500 or less, for example, p, p-diphenylmethane diisocyanate, tolylene diisocyanate, isophorone diisocyanate, diphenylmethane diisocyanate hydride, xylylene diisocyanate, 2,6-diisocyanate methyl caproate, hexamethylene diisocyanate, or the like, chain extender with a molar weight of 500 or less, for example, polymer obtained by reaction with glycol, amino alcohol, or triol are used. An especially preferable one of these polymers is polytetramethylene glycol as polyol, or polyurethane using poly-ϵ-caprolactone or polybutylene adipate. In this case, p, p'-diphenylmethane diisocynate is preferable as organic diisocyanate. Further, p, p'-dihydroxyethoxy benzene and 1,4-butane diol are preferable as the chain extender.

On the other hand, as the polyester elastomer, polyether ester block copolymer obtained by performing copolymerization using thermoplastic polyester as hard segment and using poly (alkylene oxide) glycol as soft segment, more specifically, ternary copolymer composed of at least one of dicarboxylic acids selected from aromatic dicarboxylic acid such as terephthalic acid, isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, or 3-sodium sulfoisophthalic acid, alicyclic dicarboxylic acid such as 1,4-cyclohexane dicarboxylic acid, aliphatic dicarboxylic acid such as succinic acid, oxalic acid, adipic acid, sebacic acid, dodecanedioic acid, dimer acid, ester-forming derivatives thereof, or the like; at least one of diol components selected from aliphatic diol such as 1,4-butane diol, ethylene glycol, trimethylene glycol, tetramethylene glycol, pentamethylene glycol, hexamethylene glycol, neopentyl glycol, or decamethylene glycol, or alicyclic diol such as 1,1-cyclohexan dimethanol, 1,4-cyclohexan dimethanol, or tricyclodecane dimethanol, ester-forming derivatives thereof, or the like; and at least one of poly (alkylene oxide) glycol such as polyethylene glycol, poly (1,2- and 1,3-propylene oxide) glycol, poly (tetramethylene oxide) glycol, copolymer of ethylene oxide and propylene oxide, copolymer of ethylene oxide and tetrahydrofuran, or the like, where an average molecular weight is in a range of about 400 to 5000 is used.

However, considering aspect of adhesiveness with the inelastic polyester crimped short fibers, temperature property, and strength, block copolymerization polyether polyester using polybutylene terephthalate as hard segment and using polyoxybutylene glycol as soft segment is preferable. In this case, the polyester component constituting the hard segment includes terephthalic acid as main acid component, and polybutylene terephthalate which is butylene glycol component as main diol component. Of course, a portion (generally, 30 mol % or less) of this acid component may be replaced with another dicarboxylic acid component or oxycarboxylic acid component, and similarly a portion (generally, 30 mol % or less) of glycol component may be replaced with dioxy component other than butylene glycol component.

Further, the polyether portion constituting the soft segment may be polyether replaced with dioxy component other than butylene glycol. Incidentally, various stabilizers, ultraviolet absorbent, thickening branching agent, delusterant, colorant, or other various improvers or the like may be blended in polymer according to necessity.

It is preferable that the degree of polymerization of this polyester elastomer is in a range of 0.8 to 1.7 dl/g, especially, in a range of 0.9 to 1.5 dl/g regarding inherent viscosity. If this inherent viscosity is excessively low, a heat adhesion spot formed by the polyester elastomer and the inelastic polyester crimped shot fibers constituting the matrix becomes breakable. On the other hand, if this inherent viscosity is excessively high, a spindle-shaped node becomes hard to be formed at a heat adhesion time.

As basic characteristics of the thermoplastic elastomer, a fracture elongation is preferably 500% or more, more preferably, 800% or more. If this elongation is excessively low, when the cushion body 11 is compressed and the deformation reaches the heat adhesion point, coupling at this portion becomes breakable.

On the other hand, an elongation stress of 300% of the thermoplastic elastomer is preferably 0.8 kg/mm² or less, more preferably, 0.8 kg/mm². If this stress is excessively large, it becomes hard for the heat-adhesion spot to disperse force applied on the cushion body 11, so that, when the cushion body 11 is compressed, the heat-adhesion spot may be broken by the force applied at that time, or even if it is not broken, the inelastic polyester crimped short fibers constituting the matrix may be also strained or crimps may be fatigued.

Further, elongation recovery ratio of 300% of thermoplastic elastomer is preferably 60% or more, more preferably, 70% or more. When this elongation recovery ratio is low, even if the cushion body 11 is compressed so that the heat-adhesion spot is deformed, recovery to its original state may become hard. It is required that these thermoplastic elastomers have a melting point lower than polymer constituting the inelastic polyester crimped short fibers and they do not cause crimps of the crimped short fibers to thermally fatigue at a hot-melting processing time for forming the heat-adhesion spot. Therefore, the melting point is preferably lower than the melting point of the polymer constituting the short fibers by 40° C. or more, more preferably, by 60° C. or more. Such a melting point of the thermoplastic elastomer can be set to a temperature in a range of 120 to 220° C., for example.

When the difference in this melting point is smaller than 40° C., a heat treatment temperature at a melting processing time described below is excessively high, fatigue of crimps of the inelastic polyester crimped short fibers is caused, which results in lowering of mechanical properties of the crimped short fibers. Incidentally, regarding the thermoplastic elastomer, when its melting point can not be observed clearly, a softening point thereof is observed instead of the melting point.

On the other hand, as the inelastic polyester used as a mating component of the thermoplastic elastomer of the composite fibers, polyester polymers constituting the crimped short fibers forming the matrix, such as described above, are adopted, but polyethylene terephthalate, polymethylene terephthalate, or polybutylene terephthalate is more preferably adopted among them.

The above-described composite fibers are dispersed and blended in a range of 20 to 100%, preferably, 30 to 80% based upon weight of the web 2.

In the web 2 of this embodiment, the thermally adhesive composite short fibers serving as the binder fibers and the inelastic crimped short fibers serving as the main fibers are cotton-blended at a weight ratio of 60:40.

When the dispersion and blend ratio of the composite fibers is excessively low, the number of heat-adhesion spots is reduced, so that the cushion body 11 may become easily deformable, or elasticity, repulsive property, and durability may lower. Further, cracks between tops arranged may occur.

In this embodiment, the inelastic polyester crimped short fibers and the thermally adhesive composite short fibers are cotton-blended at the weight ratio of 40:60, and they are formed in the web 2 of coating weight 20 g/m² through a roller card.

When total numbers of the fibers C oriented in the lengthwise direction (a continuous direction) in this continuous web 2 and the fibers D oriented in the lateral direction (a widthwise direction of the web) are examined per unit volume, it can be confirmed that C:D=2:1.

The web 2 of this embodiment is formed such that a ratio of fibers oriented in the lengthwise direction of the web is relatively higher than that of fibers oriented in the lateral direction. That is, the web 2 of this embodiment is formed so as to satisfy a relationship of C≧3D/2, preferably, C≧2D per unit volume.

Here, as shown in FIG. 2, the fibers oriented in the lengthwise direction of the web 2 are fibers satisfying such a condition that an angle θ of the lengthwise direction of the fibers to the lengthwise direction of the web 2 is in a range of 0°≦θ≦45°, while the fibers oriented in the lateral direction (the widthwise direction of the web) are fibers satisfying such a condition that the angle θ is in a range of 45°<θ≦90°. In the figure, reference symbol "a" represents fibers constituting the web, reference symbol "b" represents the lengthwise direction of the web, and reference symbol "c" represents the fiber direction constituting the web.

Further, regarding the orientation of the fibers constituting the sheet-like fibrous structure 4, a thickness direction of the sheet-like fibrous structure 4 and a direction extending along a direction perpendicular to a thickness direction thereof means directions within a range of ±45° to these directions.

A direction in which each fiber extends was confirmed by extracting random portions in a surface layer portion and an inner layer portion of the web 2 to observe them using a transmission type optical microscope.

Incidentally, the thickness of the web 2 is 5 mm or more, preferably, 10 mm or more, further preferably 20 mm or more. Generally, the web 2 has a thickness of about 5 to 150 mm.

Next, the web 2 formed such that fibers mainly extend along the lengthwise direction is folded like an accordion such that it has a predetermined density and a desired thickness as a structural body, so that cubic fiber crossing points are formed between the composite fibers and between the inelastic polyester crimped short fiber and the composite fibers, and heat treatment is then performed at a temperature lower than the melting point of polyester polymer and higher than the melting point (or a fluidization start point) of the thermoplastic elastomer by 10 to 80° C., so that elastomer component are melt-adhered at the fiber crossing points and flexible heat-adhesion spots are formed.

Specifically, as shown in FIG. 3, the web 2 is folded to an accordion shape by pushing the web 2 into a hot-air suction type heat treatment machine 62 (a length of a heat treatment zone is 5 m and a moving velocity is 1 m/min) by a driving roller 61 with a roller surface velocity of 2.5 m/min and it is formed in a heat-adhered sheet-like fibrous structure 4 with a thickness of 25 mm by treating the web 2 at 190° C. for five minutes using Struto equipment.

Adhesion spots thermally adhering in a state the thermally adhesive composite short fibers have crossed one another and adhesion spots thermally adhering in a state that the thermally adhesive composite short fibers and the inelastic crimped short fibers have crossed one another are dispersed in the sheet-like fibrous structure 4 thus formed.

It is appropriate for developing cushioning properties, ventilation properties, and elasticity that the density of the sheet-like fibrous structure 4 is in a range of 0.015 to 0.20 g/cm³.

By forming the web 2 formed such that their fibers extend along the lengthwise direction in a folding manner, the sheet-like fibrous structure 4 is formed such that the number of fibers oriented in the thickness direction is larger than that of fibers oriented in a direction perpendicular to the thickness direction and a direction of the fibers mainly becomes parallel to the thickness direction. That is, the sheet-like fibrous structure 4 in this embodiment is formed such that when the total number of fibers arranged along in the thickness direction is represented as A and the total number of fibers arranged along the direction perpendicular to the thickness direction is represented as B regarding unit volume, a relationship of $A \geqq 3B/2$, preferably, $A \geqq 2B$ is satisfied.

Next, the sheet-like fibrous structure 4 is cut in a predetermined shape, and the cut pieces are stacked in a vertical direction, as shown in FIG. 4. In this embodiment, an approximately-rectangular sheet-like fibrous structure 4a, a sheet-like fibrous structure 4b, a U-shaped sheet-like fibrous structure 4c for forming a bank portion of the cushion body 11, and a sheet-like fibrous structure 4d for forming a protrusion portion to be slightly protruded between both thighs of an occupant are cut, the sheet-like fibrous structure 4c and the sheet-like fibrous structure 4d are sandwiched between the sheet-like fibrous structure 4a and the sheet-like fibrous structure 4b. These sheet-like fibrous structures 4a to 4d are stacked in their thickness directions. That is, stacking is performed such that a direction of fibers extends in a vertical direction.

Further, holt-melt films, hot-melt unwoven cloths, hot-melt adhesives, or the like are arranged at portions where the sheet-like fibrous structures 4a to 4d abut on one another according to necessity.

The sheet-like fibrous structures 4a to 4d thus stacked are arranged in a mold 40 such as shown in FIG. 5 and compressed. The mold 40 of this embodiment is composed of an upper mold and a lower mold. When the upper mold and the lower mold are fastened, a cavity 40a having a desired undulation shape of the cushion body 11 is formed. Further, steam holes 41 are formed on a portion or a whole of a mold face of the mold 40. The mold 40 can be formed with resin by using metal such as iron, steel, aluminum, or glass fiber, or carbon fiber, or it may be formed with any synthetic resin.

FIG. 6 is a sectional view of a state that the sheet-like fibrous structures 4a to 4d have been disposed in the mold 40 and the mold 40 has been fastened. The sheet-like fibrous structures 4a to 4d are formed to be larger than the cavity 40a of the mold 40 in a natural state by about 1.2 to 3.0 times in volume. Accordingly, the sheet-like fibrous structures 4a to 4d are changed to a state that they have been compressed to the shape of the cavity 40a at a mold fastening time.

Next, the mold 40 in which the sheet-like fibrous structures 4a to 4d have been disposed is put in a high pressure steam molding machine 50. Then, the inside of the high pressure steam molding machine 50 is pressurized to about 2 to 8 atmospheres higher than an atmospheric pressure, and steam with a temperature of about 120° C. to 180° C. is blown to the mold 40 for one to three minutes. After steam is blown to the mold 40, cooling and mold-releasing are performed to obtain a cushion body 11.

In this embodiment, the inside thereof was pressurized to 5.5 atmospheres, and steam is blown to the mold 40 for about one minute and ten seconds. The temperature of the steam was set to be higher than the melting point of the thermally adhesive composite short fibers, that is, the melting point of the thermoplastic elastomer and lower than the melting point of the inelastic crimped short fibers. Further, a tact time was set to three to five minutes.

By blowing steam to the mold in this manner, steam enters in the sheet-like fibrous structures 4a to 4d having ventilation properties from steam holes 41 of the mold 40. The sheet-like fibrous structures 4a to 4d are disposed in the mold 40 in their compressed state, and crossing points between the thermally adhesive composite short fibers and between the thermally adhesive composite short fibers and the inelastic crimped short fibers are caused to thermally adhere to one another due to steam heat so that the cushion body 11 is formed in the shape of the cavity 40a of the mold 40.

Further, hot-melt films, hot-melt unwoven clothes, hot-melt adhesives, or the like disposed among the sheet-like fibrous structures 4a to 4d are melted due to steam heat and the sheet-like fibrous structures 4a to 4d are fixed to one another.

Thus, fibers in the sheet-like fibrous structures 4a to 4d are caused to thermally adhere to one another due to steam and the sheet-like fibrous structures 4a to 4d are fixed to one another by the hot-melt film, a hot-melt unwoven cloth, hot-melt adhesive, or the like, so that a cushion body 11 with a predetermined shape is formed. Incidentally, dish cloth may be inserted on a surface according to necessity, or wires made from steel or the like may be inserted among the sheet-like fibrous structures 4a to 4d.

In the cushion body 11 of this embodiment, the sheet-like fibrous structures 4a to 4d where the directions of fibers are oriented in the thickness direction are stacked to perform the high pressure steam molding. Accordingly, the fibers constituting the cushion body 11 are arranged along a direction in which a load is applied when an occupant sits on the seat 1. With such a constitution, the cushion body 11 of this embodiment has ventilation properties and can secure proper hardness to a stress direction, and it is excelling in dispersibility of stress and excellent durability.

Further, the cushion body 11 of this embodiment is molded in a state in which it has been compressed by the mold 40, and it can take a three-dimensional and complicated undulation shape so as to correspond with the shape of the cavity of the mold 40. At this time, cushioning feeling can be adjusted partially according to a compression degree in the mold 40.

Though the cushion body 11 has been explained above, a cushion body 21 can be similarly formed. Regarding the cushion body 21, a direction in which a load is applied during sitting of an occupant is a thickness direction of the cushion body 21. Accordingly, in order to secure hardness, dispersibility of stress, or durability in a stress direction, it is desirable to form a three-dimensional shape by stacking sheet-like fibrous structures in a direction in which stress is applied and performing high pressure steam forming in the mold 40. Then, the seat 1 is formed by arranging the cushion bodies 11 and 21 thus formed on the sheet frames 15 and 25 and covering them with covers 13 and 23.

Incidentally, when the cushion body 11 is formed, the cover 13 and the sheet-like fibrous structures 4a to 4d are stacked through the intervention of hot-melt films, hot-melt unwoven clothes, hot-melt adhesives, or the like, and they are disposed in the mold 40, so that high pressure steam molding may be performed. Thereby, the cover 13 can be formed integrally with the cushion body 11. The cover 23 may be similarly handled.

Next, the cushion body 11 of the seat 1 formed in the above manner was pressured in a test. Specifically, applying a load with a load of 70 kg to the cushion body 11 was repeated seven hundred thousand times at an accelerated velocity of 0.5 to 1.0 G.

As a result, the outer shape of the cushion body 11 became distorted by about 14 mm. That is, a permanent set in fatigue was generated. Further, flexing force at the distorted portion lowered.

Steam with a temperature of 80° C. to 130° C. under atmospheric pressure was blown to the cushion body 11 where a permanent set in fatigue was generated in this manner for five seconds. By blowing steam for a little time in this manner, the portion where a permanent set in fatigue was generated recovered its original shape rapidly. When the outer shape was measured after blowing of the steam, it was confirmed that a portion distorted by about 15 mm before blowing of steam recovered to have distortion of about 1 mm. Further, the flexing force recovered to a level equal to that before generation of the permanent set in fatigue.

Further, it was observed that the cushion body 11 also recovered from a permanent set in fatigue similarly when a blowing time of steam is set to about 20 to 50 seconds.

In this manner, it was confirmed that the cushion body 11 recovered from a permanent set in fatigue by blowing steam with a temperature equal to higher than glass transition points of the thermally adhesive composite short fibers and the inelastic crimped short fibers forming the cushion body 11 and lower than a melting point of the thermally adhesive composite short fibers to the cushion body 11 where a permanent set in fatigue was generated under atmospheric pressure.

Incidentally, in the above-described embodiment, the cushion bodies 11 and 21 obtained by stacking the sheet-like fibrous structures 4 in the seat portion 10 and the seatback portion 20 and performing high pressure steam forming are used, but not limited to the seat portion 10 and the seatback portion 20, the cushion body obtained by stacking the sheet-like fibrous structures 4 and performing high pressure steam forming may be used in a portion where a load is applied by an occupant, such as an armrest or a headrest.

INDUSTRIAL APPLICABILITY

According to the present invention, a cushion body having three-dimensional undulation is constituted by stacking sheet-like fibrous structures formed such that a lengthwise direction of fibers extends in a thickness direction and performing high pressure steam molding in a mold. The seat according to the present invention has such a configuration that a cushion body having three-dimensional shape formed such that constituent fibers extend in a thickness direction is disposed on a seat frame such that a direction of fibers extends in a stress direction.

Since such a configuration allows a cushion body to be formed into a three-dimensional undulation shape, feeling of sitting can be comfortable in the seat according to the present invention. Further, since the cushion body is formed such that a lengthwise direction of fibers extends in a thickness direction, steam heat generated during molding is easy to be conducted so that s molding time can be shortened, and simultaneously an end portion of a molded product can be molded finely. Further, since the lengthwise direction of fibers mainly extends in a load direction, the cushion body can excel in ventilation, of course, have proper hardness to a stress direction, can disperse stress, and excel in durability.

The seat according to the present invention can easily recover its original shape and flexing force by blowing steam with a predetermined temperature even if a permanent set in fatigue is generated due to repetitive application of a load. As described above, since the seat can recover from a permanent set in fatigue by such a simple treatment as blowing steam with a predetermined temperature, comfortable feeling of sitting can be maintained for a long time without a troublesome treatment.

The invention claimed is:

1. A method of manufacturing a seat comprising a seat frame, a cushion body disposed on the seat frame, and a cover covering the cushion body, the method comprising:
    a cushion body forming step of forming the cushion body; and
    an assembling step of attaching the cushion body and the cover on the seat frame, wherein
    in the cushion body forming step, the cushion body is formed by forming a sheet-shaped fibrous structure such that adhesion spots where thermally adhesive composite short fibers are caused to thermally adhere to one another in a state in which the thermally adhesive composite short fibers have crossed one another and adhesion spots where inelastic crimped short fibers having a melting point higher than that of the thermally adhesive composite short fibers and the thermally adhesive composite short fibers are caused to thermally adhere to one another in a state in which the inelastic crimped short fibers and the thermally adhesive composite short fibers have crossed each other are dispersed and distributed and a relationship of $A \geq 3B/2$ is satisfied when the number of short fibers arranged along in a thickness direction is represented as A and the number of short fibers arranged along a direction perpendicular to the thickness direction is represented as B regarding unit volume, and then cutting the sheet-shaped fibrous structure into plural pieces having predetermined shapes;
    disposing the plurality of sheet-shaped fibrous structures in a mold having a cavity with a predetermined shape and formed with steam holes in a state in which the plurality of sheet-shaped fibrous structures are stacked and compressed in a thickness direction; and
    blowing steam to the mold at an air pressure higher than atmospheric pressure;
    wherein the seat manufactured by said method comprises a seat frame, a cushion body, and a cover covering the cushion body,
    wherein the cushion body comprises a sheet-shaped fibrous structure which satisfies a relationship of $A \geq 3B/2$ when the number of short fibers arranged along in a thickness direction is represented as A and the number of short fibers arranged along a direction perpendicular to the thickness direction is represented as B regarding unit volume.

2. A method of treatment for recovery from a permanent set in fatigue of a seat comprising a seat frame, a cushion body obtained by forming a plurality of sheet-shaped fibrous structures integrally, and a cover covering the cushion body, wherein
    the sheet-shaped fibrous structure is formed such that adhesion spots where thermally adhesive composite short fibers are caused to thermally adhere to one another in a state in which thermally adhesive composite short fibers have crossed one another and adhesion spots where inelastic crimped short fibers having a melting point higher than that of the thermally adhesive composite short fibers and the thermally adhesive composite short fibers are caused to thermally adhere to one another in a state in which the inelastic crimped short fibers and the thermally adhesive composite short fibers have crossed each other are dispersed and distributed, the sheet-shaped fibrous structure satisfies a relationship of $A \geqq 3B/2$ when the number of short fibers arranged along in a thickness direction is represented as A and the number of short fibers arranged along a direction perpendicular to the thickness direction is represented as B regarding unit volume, the cushion body is formed integrally by disposing the plurality of sheet-shaped fibrous structures in a mold having a cavity with a predetermined shape and formed with steam holes in a state that the sheet-shaped fibrous structures are stacked and compressed in a thickness direction, and by blowing steam to the mold at an air pressure higher than atmospheric pressure, and the cushion body is disposed on the seat frame such that a thickness direction of the cushion body extends along a direction in which a load is applied during sitting of a seat occupant; and steam with a temperature higher than glass transition points of the thermally adhesive composite short fibers and the inelastic crimped short fibers and lower than the melting point of the thermally adhesive composite short fibers is blown to the cushion body;

wherein the cushion body comprises a sheet-shaped fibrous structure which satisfies a relationship of $A \geqq 3B/2$ when the number of short fibers arranged along in a thickness direction is represented as A and the number of short fibers arranged along a direction perpendicular to the thickness direction is represented as B regarding unit volume.

\* \* \* \* \*